3,367,903
MAGNESIUM OXIDE OR MIXTURE OF MAGNESIUM OXIDE AND ZINC OXIDE CONTAINING PEROXIDE CURED ETHYLENE - PROPYLENE COPOLYMER AND METHOD FOR PREPARING SAME
William H. Deis, Belmont, Calif., and Thomas G. Gaspar, New Brunswick, N.J., assignors to Merck & Co., Inc., Rahway, N.J., a corporation of New Jersey
No Drawing. Filed Sept. 14, 1964, Ser. No. 396,353
8 Claims. (Cl. 260—41)

ABSTRACT OF THE DISCLOSURE

Peroxide cured ethylene-propylene copolymer elastomeric compositions which contain magnesium oxide or a mixture of zinc and magnesium oxide and which show improved retention of physical properties after aging.

---

This invention relates to elastomeric compositions and more particularly to ethylene-propylene copolymer elastomeric compositions. Specifically, it relates to peroxide cured elastomeric compositions of ethylene-propylene copolymers containing metallic oxides and which show improved retention of physical properties after aging.

It is generally known that copolymers of ethylene and propylene can be cross-linked to form elastomeric vulcanizates useful in a variety of applications. Such systems, in general, and the sulfur-modified, carbon black-filled, peroxide-cured, ethylene-propylene copolymers in particular, can have serious disadvantages which have hindered their acceptance. In particular, in materials aged at high temperatures, the tensile strength, modulus, and elongation of the vulcanizates are drastically and unfavorably affected, thus making the useful life of such vulcanizates short and uneconomical. Additionally, prevulcanizing processing tends to be very difficult because the prevulcanizate does not adhere well to the rubber mill rollers and instead tends to "bag" or "loop." The terms "bag" and "loop" describe the tendency of the compound to separate from the mill-rolls.

The present invention overcomes the disadvantages of the prior art and has among its objects the provision of an easily processed prevulcanizate of ethylene-propylene copolymers; the provision of vulcanized material, which after prolonged exposure to high temperatures possesses high retained physical properties, and in particular high tensile strength, modulus, and elongation, all with less deviation from the original material than that shown by untreated material; and other objects which will be apparent from a consideration of the following detailed disclosure.

According to the present invention, it has been discovered that the advantages above described are obtained in a vulcanizate prepared by vulcanizing a composition comprising an ethylene-propylene copolymer, magnesium oxide, sulfur, carbon black, and a peroxide selected from the group consisting of dicumyl peroxide and 2,5-dimethyl-2,5-di-(t-butylperoxy)-hexane, all in intimate admixture. It is through the addition of the magnesium oxide that the characteristics of the compounds are improved. The improvements are noticeable in:

(1) Improved aged properties:

(a) Higher aged tensile strength and less deviation from the original value.
(b) Higher aged modulus and less deviation from the original value.
(c) Less deviation of the ultimate elongation of aged specimens from the original value.
(d) Less deviation of the hardness of aged specimens from the original value.

(2) Lower compression set (with dicumyl peroxide).

These advantages are obtained without seriously affecting processing safety (scorch) as determined by Mooney viscosity tests. The advantages are also obtained if, in addition to the magnesium oxide, there is added a quantity of zinc oxide. Such a mixture is preferred.

An additional advantage is that magnesium oxide reduces the shrinkage of the unvulcanized compound during processing and eliminates bagging or looping on mill rolls. Addition of magnesium oxide to ethylene-propylene copolymers causes the compound to adhere to the mill rolls to a convenient degree giving mill processability which is similar to that of natural rubber.

The practical benefits of this invention are especially important in applications where resistance to prolonged high temperature exposure and low compression set are essential. The improvement in processing is also of considerable importance from the practical point of view.

The ethylene-propylene copolymer used in the present invention may be any which is elastomeric and useful as a vulcanized material. As is known, elastomeric ethylene-propylene copolymers should contain at least about 20% by weight and not more than 74.5% of ethylene monomer units, and at least 25% and not more than 79.5% of propylene monomer units. Preferably the range for each is from 35–65 weight percent.

The amount of metallic oxide used depends largely upon the vulcanizate properties desired. Generally, amounts of magnesium oxide ranging from 3–10 parts per hundred parts of ethylene-propylene copolymer produce suitable results with 4–8 being the preferred range. As stated above, the systems in which the added magnesium oxide produces the benefits herein disclosed are the black-filled, sulfur-modified, ethylene-propylene vulcanizates, cured with either dicumyl peroxide or 2,5-dimethyl-2,5-di-(t-butylperoxy)-hexane. Typical ranges of ingredients for such compositions exclusive of the magnesium oxide are as follows (all based on 100 parts of ethylene-propylene copolymer):

| | Parts |
|---|---|
| Ethylene-propylene copolymer | 100 |
| Carbon black | 5–100 |
| Sulfur | 0.01–1 |
| Dicumyl peroxide | 1–10 |
| or | |
| 2,5-dimethyl-2,5-di-(t-butylperoxy)-hexane | 1–10 |
| Zinc oxide | 0–20 |

Additionally, the blend may contain other ingredients well known in the art to be useful such as antioxidants, lubricators, and the like.

The preferred blends for use in this invention are as follows:

| | Parts |
|---|---|
| Ethylene-propylene copolymer | 100 |
| Carbon black | 30–60 |
| Sulfur | 0.2–0.4 |
| Dicumyl peroxide | 2–6 |
| or | |
| 2,5-dimethyl-2,5-di-(t-butylperoxy)-hexane | 2–6 |
| Zinc oxide | 5–10 |

The following examples are given for purposes of illustration only and are not intended to limit the scope of the invention.

*Example 1*

| Base compound: | Parts [1] |
|---|---|
| Ethylene-propylene copolymer [2] | 100 |
| Carbon black HAF | 50 |
| Sulfur | 0.32 |
| Calcium stearate [3] | 1 |
| Dicumyl peroxide [4] | 3 |
| | 154.32 |

[1] Parts by weight.
[2] Contains 43 weight percent ethylene—available as Enjay EPR 404.
[3] Stearic acid, 0.33 part, was used as a replacement for calcium stearate in Compound C, Example 1. We have evidence that in compounds containing 1+ parts of metallic oxide this replacement of lubricants has no measurable effect.
[4] Dicup-T (90–93% active peroxide).

The above materials are blended to a uniform, well-dispersed composition along with the variable ingredients shown below on a water cooled mill. The peroxide is added as the final ingredient to minimize premature vulcanization. Compression set specimens are cured at 320° F. for 35 minutes whereas stress-strain hardness specimens are cured for 30 minutes at 320° F. The aging for stress-strain hardness measurements is at 300° F. for 72 hours.

The following table shows the effect of magnesium oxide on the physical properties of the vulcanizate and the prevulcanizate in the case of compression set.

| Compound | A | B | C | D | E | F |
|---|---|---|---|---|---|---|
| Variables, parts: | | | | | | |
| Magnesium oxide | | | | 8 | 8 | 8 |
| Zinc oxide | | | 10 | | 8 | 8 |
| Age Rite Resin D [1] | | 0.5 | | | | 0.5 |
| Valcanizate properties, Mooney Scorch, 280° F. LR: Time for 5 points rise above minimum viscosity, minutes | 7.9 | 8.0 | 8.8 | 6.0 | 6.3 | 7.3 |
| Compression set, percent (ASTM D395-61 Method B): After 70 hrs., 250° F. | 55.2 | 44.4 | 38.2 | 23.3 | 23.8 | 27.7 |
| Stress-Strain and Hardness: | | | | | | |
| Modulus at 300%, p.s.i.: | | | | | | |
| Original | 1,360 | 1,350 | 1,670 | 1,720 | 1,610 | 1,480 |
| Aged | 30 | 400 | 800 | 1,100 | 1,100 | 1,250 |
| Percent Original retained | 2.2 | 29.6 | 47.9 | 64.0 | 68.3 | 84.5 |
| Tensile strength, p.s.i.: | | | | | | |
| Original | 2,850 | 2,600 | 2,450 | 2,720 | 2,300 | 2,400 |
| Aged | 30 | 50 | 1,640 | 2,000 | 1,700 | 2,040 |
| Percent Original retained | 1.1 | 1.9 | 66.9 | 73.5 | 73.9 | 85.0 |
| Ultimate elongation, percent: | | | | | | |
| Original | 520 | 480 | 400 | 410 | 370 | 400 |
| Aged | 420 | 500 | 520 | 460 | 440 | 450 |
| Percent Original retained | 80.8 | 104 | 130 | 112 | 119 | 113 |
| Hardness (Shore A-2): | | | | | | |
| Original | 63 | 63 | 65 | 66 | 68 | 67 |
| Aged | 50 | 57 | 67 | 68 | 70 | 71 |
| Change=Aged-Original | −13 | −6 | +2 | +2 | +2 | +4 |

[1] Antioxidant=Polymerized trimethyl dihydroquinoline.

*Example 2*

| Base compound: | Parts |
|---|---|
| Ethylene-propylene copolymer (type 404) | 100 |
| Carbon black HAF | 50 |
| Sulfur | 0.32 |
| Calcium stearate | 1 |
| 2,5-dimethyl-2,5-(t-butylperoxy)-hexane | 2.9 |
| | 154.22 |

The procedure of Example 1 is followed using a compression set specimen curing of 50 minutes at 330° F., stress-strain specimen curing of 45 minutes at 330° F., and stress-strain specimen aging of 70 hours at 300° F.

| Compound | A | B | C | D | E | F |
|---|---|---|---|---|---|---|
| Variables, parts: | | | | | | |
| Magnesium oxide | | | | 5 | 5 | 5 |
| Zinc oxide | | | 5 | | 5 | 5 |
| Age Rite Resin D | | 0.5 | | | | 0.5 |
| Vulcanizate properties, Mooney Scorch, 280° F. LR: Time for 5 points rise above minimum viscosity, minutes | 12.3 | 17.9 | 12.5 | 11.5 | 11.2 | 14.8 |
| Compression set, percent (ASTM D395-61 Method B): After 70 hrs., 250° F. | 23.1 | 30.5 | 19.5 | 19.0 | 18.9 | 24.3 |
| Stress-Strain and Hardness: | | | | | | |
| Modulus at 300%, p.s.i.: | | | | | | |
| Original | 1,800 | 1,310 | 1,750 | 1,700 | 1,620 | 1,400 |
| Aged | 0 | 500 | 1,040 | 1,100 | 1,190 | 1,200 |
| Percent original retained | 0 | 38.2 | 59.4 | 64.7 | 73.5 | 85.7 |
| Tensile strength, p.s.i.: | | | | | | |
| Original | 2,680 | 2,850 | 2,100 | 2,600 | 2,320 | 2,390 |
| Aged | 90 | 900 | 1,700 | 2,010 | 1,880 | 2,080 |
| Percent original retained | 3.4 | 31.6 | 81.0 | 77.3 | 81.0 | 87.0 |
| Ultimate elongation, percent: | | | | | | |
| Original | 400 | 500 | 350 | 420 | 370 | 430 |
| Aged | 260 | 450 | 450 | 460 | 450 | 460 |
| Percent original retained | 65 | 90.0 | 127 | 110 | 121.6 | 107.0 |
| Hardness (Shore A-2): | | | | | | |
| Original | 65 | 63 | 65 | 67 | 67 | 65 |
| Aged | 56 | 62 | 67 | 68 | 70 | 70 |
| Change=Aged-Original | −9 | −1 | +2 | +1 | +3 | +2 |

It is apparent from Examples 1 and 2 that (1) compounds without the oxides show very poor aging characteristics; (2) addition of metallic oxides, either alone or in combination, improves aging and reduces compression set; and (3) best aging is obtained with metallic oxides and antioxidant, but the latter increases compression set.

*Example 3*

The procedure is that of Example 1. Compression set specimens cured for 35 minutes at 320° F.; stress-strain specimens cured for 30 minutes at 320° F.; aging conditions 73 hours at 300° F.

| Base compound: | Parts |
|---|---|
| Ethylene-propylene copolymer (type 404) | 100 |
| Carbon black HAF | 50 |
| Sulfur | 0.32 |
| Calcium stearate | 1 |
| Dicumyl peroxide [1] | 3.0 |
| | 154.32 |

[1] Dicup-T (90–93% active peroxide).

| Compound | A | B | C |
|---|---|---|---|
| Variables, parts, Magnesium oxide: | | | |
| Type A | 8 | | |
| Type B | | 8 | |
| Type C | | | 8 |
| Vulcanizate properties, Mooney Scorch; 280° F. LR: Time for 5 points rise above minimum viscosity, minutes | 6.0 | 6.4 | 6.4 |
| Compression set, percent (ASTM D395-61 Method B): After 70 hrs., 250° F | 23.3 | 21.5 | 27.2 |
| Stress-Strain and Hardness: | | | |
| Modulus at 300%, p.s.i.: | | | |
| Original | 1,720 | 1,930 | 2,000 |
| Aged | 1,100 | 1,350 | 1,340 |
| Percent Original retained | 64.0 | 70.0 | 67.0 |
| Tensile strength, p.s.i.: | | | |
| Original | 2,720 | 2,580 | 2,450 |
| Aged | 2,000 | 2,200 | 2,200 |
| Percent Original retained | 73.5 | 85.3 | 89.8 |
| Ultimate elongation, percent: | | | |
| Original | 410 | 380 | 370 |
| Aged | 460 | 450 | 440 |
| Percent Original retained | 112 | 118 | 119 |
| Hardness (Short A-2): | | | |
| Original | 66 | 67 | 67 |
| Aged | 68 | 68 | 62 |
| Change=Aged-Original | +2 | +1 | +2 |

Example 3 provides three replicates of the use of magnesium oxide alone and demonstrates the achievement of high compression set with good aging characteristics.

*Example 4*

The procedure is that of Example 1. Compression set specimens cured for 35 minutes at 320° F.; stress-strain specimens cured for 30 minutes at 320° F.; aging conditions 72 hours at 300° F.

Base compound: Parts
Dutral (ethylene-propylene copolymer available from Montecatini S.G.) — 100
Carbon black HAF — 50
—
150

| Compound | A | B |
|---|---|---|
| Variables, parts: | | |
| Dicumyl peroxide (see Ex. 3 f.n.⁶) | 3.0 | 3.0 |
| Sulfur | 0.32 | 0.32 |
| Calcium stearate | 1 | 1 |
| Magnesium oxide | 8 | 8 |
| Zinc oxide | | 8 |
| Vulcanizate properties, Mooney Scorch, 280° F. LR: Time for 5 points rise above minimum viscosity minutes | 7.1 | 7.1 |
| Compression set, percent (ASTM D395-61 Method B): After 70 hrs., 250° F | 3.61 | 21.5 |
| Stress, Strain and Hardness: | | |
| Modulus at 300%, p.s.i.: | | |
| Original | 1,660 | 1,710 |
| Aged | 0 | 1,040 |
| Percent original retained | 0 | 60.8 |
| Tensile strength, p.s.i.: | | |
| Original | 2,650 | 2,212 |
| Aged | 0 | 1,300 |
| Percent original retained | 0 | 58.8 |
| Ultimate elongation, percent: | | |
| Original | 420 | 350 |
| Aged | 50 | 384 |
| Percent original retained | 11.9 | 108.0 |
| Hardness: | | |
| Original | 61 | 66 |
| Aged | 44 | 60 |
| Change=Aged-Original | -17 | +6 |

Employed here is another form of ethylene-propylene copolymer. It is demonstrated that the metallic oxides afford better aging and lower compression set in various forms of ethylene-propylene copolymer.

Any departure from the above description which conforms to the present invention is intended to be included within the scope of the claims.

What is claimed is:

1. A rubber composition consisting essentially of in intimate admixture an elastomeric ethylene-propylene copolymer, from 5-100 parts by weight of carbon black, from 0.01-1.0 part by weight of sulfur, from 1-10 parts of a peroxide selected from the group consisting of dicumyl peroxide and 2,5-dimethyl-2,5-di-(t-butylperoxy)-hexane, from 0-20 parts of zinc oxide, and from 3-10 parts of magnesium oxide, all per 100 parts of said ethylene-propylene copolymer.

2. A composition according to claim 1 wherein the ethylene-propylene copolymer comprises from 35-65 weight percent of ethylene monomer units and from 35-65 weight percent of propylene monomer units.

3. A rubber composition consisting essentially of in intimate admixture an elastomeric ethylene-propylene copolymer, from 30-60 parts by weight of carbon black, from 0.2-0.4 part by weight of sulfur, from 2-6 parts of a peroxide selected from the group consisting of dicumyl peroxide and 2,5-dimethyl-2,5-di-(t-butylperoxy)-hexane, from 0-10 parts of zinc oxide, and from 4-8 parts of magnesium oxide, all per 100 parts of said ethylene-propylene copolymer.

4. A composition according to claim 3 wherein the ethylene-propylene copolymer comprises from 35-65 weight percent of propylene monomer units.

5. The method for producing a vulcanizate possessing improved physical characteristics after high temperature aging which comprises vulcanizing a composition consisting essentially of in intimate admixture an elastomeric ethylene-propylene copolymer, from 5-100 parts by weight of carbon black, from 0.01-1.0 part by weight of sulfur, from 1-10 parts of a peroxide selected from the group consisting of dicumyl peroxide and 2,5-dimethyl-2,5-di-(t-butylperoxy)-hexane, from 0-20 parts of zinc oxide, and from 3-10 parts of magnesium oxide, all per 100 parts of said ethylene-propylene copolymer.

6. The method according to claim 5 wherein the ethylene-propylene copolymer comprises from 35-65 weight percent of ethylene monomer units and from 35-65 weight percent of propylene monomer units.

7. The method for producing a vulcanizate possessing improved physical characteristics after high temperature aging which comprises vulcanizing a composition consisting essentially of in intimate admixture an elastomeric ethylene-propylene copolymer, from 30-60 parts by weight of carbon black, from 0.2-0.4 part by weight of sulfur, from 2-6 parts of a peroxide selected from the group consisting of dicumyl peroxide and 2,5-dimethyl-2,5-di-(t-butylperoxy)-hexane, from 0-10 parts of zinc oxide, and from 4-8 parts of magnesium oxide, all per 100 parts of said ethylene-propylene copolymer.

8. The method according to claim 7 wherein the ethylene-propylene copolymer comprises from 35-65 weight percent of ethylene monomer units and from 35-65 weight percent of propylene monomer units.

References Cited

UNITED STATES PATENTS

| 3,159,596 | 12/1964 | Falcone et al. | 260—41 |
| 3,166,538 | 1/1965 | Olson et al. | 260—41 |
| 3,173,903 | 3/1965 | Lukach et al. | 260—41 |
| 3,257,346 | 6/1966 | Grover et al. | 260—41 |

ALLAN LIEBERMAN, *Primary Examiner.*